United States Patent [19]
Chung

[11] Patent Number: 5,993,353
[45] Date of Patent: Nov. 30, 1999

[54] SHIFT LEVER DEVICE FOR AN AUTOMATIC TRANSMISSION OF A VEHICLE

[75] Inventor: Won-Jin Chung, Kyungki-do, Rep. of Korea

[73] Assignee: Hyundai Motor Company, Ltd., Seoul, Rep. of Korea

[21] Appl. No.: 08/990,724

[22] Filed: Dec. 15, 1997

[51] Int. Cl.[6] .............................. B60K 41/20; B60K 41/26
[52] U.S. Cl. .............................................. 477/96; 192/218
[58] Field of Search .............................. 477/96; 192/4 A, 192/220.2–220.07, 218; 70/248, 247; 74/483 R

[56] References Cited

U.S. PATENT DOCUMENTS

| | | | |
|---|---|---|---|
| 4,938,042 | 7/1990 | Muramatsu | 477/96 X |
| 5,314,049 | 5/1994 | Nordstrom | 477/96 |
| 5,379,871 | 1/1995 | Asano et al. | 477/96 |
| 5,490,585 | 2/1996 | Togano | 477/96 |
| 5,695,429 | 12/1997 | Kataumi et al. | 477/96 |

*Primary Examiner*—Charles A. Marmor
*Assistant Examiner*—Roger Pang

[57] ABSTRACT

A shift lever device of the automatic transmission of a vehicle comprising a shift lever pivotally mounted at one end portion thereof and containing an operating means at the other end portion thereof, a detent pin disposed intermediate the end portion for displacement in response to the operating means, a detent plate operatively associated with the shift lever and containing a plurality of grooves for selectively receiving the detent pin by the operation of the operating means and the pivotal rotation of the shift lever, and a shift lock release lever pivotally mounted at one end, relative to the shift lever, the shift lock release lever containing a locking means pivotally mounted at the other end thereof for selectively securing the detent pin in the detent plate or releasing the detent pin for movement to the other grooves of said detent plate.

4 Claims, 3 Drawing Sheets

SHIFT LEVER DEVICE FOR AN AUTOMATIC TRANSMISSION OF A VEHICLE

BACKGROUND OF THE INVENTION

1. Field of the Invention

The present invention relates to an improved shift lever device for the automatic transmission of a vehicle and more particularly, to a shift lever device having a switch which functions both as a "P" or park position sensing switch and as a key interlock switch for eliminating the "P" or park switch, thus reducing wiring lines, reducing cost, and reducing the weight of the vehicle.

2. Description of Related Art

Various types of shift lever devices are known in the art. Generally, in a vehicle containing an automatic transmission, the shift range is accomplished by a reciprocating movement and the shift lever is provided with an indicating panel for indicating all of the shift ranges, disposed at one side thereof, so that the shift lever can be controlled by the driver's desire.

As shown in FIG. 1, a conventional shift lever device includes a shift lever 100 pivotally attached to a hinge axle 102 so as to rotate at a certain angle for shifting to a desired shift range position. The shift lever 100 is further provided with a detent plate 104 having a plurality of grooves 106, a detent pin 108 for selectively engaging one of the grooves 106 when the detent pin 108 moves along the detent plate by moving the shift lever 100. The shift lever 100 is moved by depressing a push button 120 disposed on knob 118. A shift lock release lever 102 is operated by a shift lock solenoid valve 110, a parking position switch 114 for sensing a "P" or park position of the shift lever 100, and a key interlock switch 116.

The conventional shift lever device operates as follows. After pushing the push button 120 when the shift lever 100 shifts to the "P" or park position, for parking, the parking position switch senses this step and transmits a signal to a transmission controlling unit (not shown). Thereafter, when the push button 120 is released, an ignition key (not shown) can be separated from a key hole (not shown) since the key interlock switch 116 is operated by the detent pin 108. At this time, even though the user pushes the push button 120 of the knob 118, a position change is impossible since the detent pin 108 is engaged in the groove 106 of the detent plate 104.

And at this time, when the user ignites through the ignition key and pushes a brake pedal (not shown), the transmission controlling unit transmits a signal to the shift lock solenoid valve 110 so that the shift solenoid valve 110 actuates. That is, the shift lock release lever 102 moves forward for releasing the locking of the detent pin 108. At this state, when the shift lever 100 shifts to another position, the parking position switch 114 transmits a signal to the transmission controlling unit for deactivating the shift lock solenoid valve 110, so that the shift lock release lever 102 returns to its original position.

Thus, for safety of driving, the ignition key can be removed from the key hole only when the shift lever 100 is in the "P" or park position, and only when the user operates the brake can the shift lever 100 be shifted to other positions. Therefore, the traffic accident can be eliminated and reduced.

However, since the conventional shift lever devices contain two switch systems, i.e. a parking position switch and a key interlock switch, the conventional shift lever devices are complicated in structure, expensive to manufacture, contain a plurality of distributing wires, and are heavy in weight.

SUMMARY OF THE INVENTION

Accordingly, it is an object of the present invention to provide a shift lever deice for an automatic transmission of a vehicle, which eliminates the above problems encountered with conventional shift lever devices for the automatic transmission of a vehicle.

Another object of the present invention is to provide a key interlock switch having the dual function of a parking position switch and a key interlock switch, which eliminates the "P" or park position sensing switch, thereby reducing distributing wires, lowers cost, and reduces vehicle weight.

A further object of the present invention is to provide an improved shift lever device for an automatic transmission of a vehicle which includes a shift lever which rotates about a lower portion of a hinge axle at a certain angle, a detent plate having a plurality of grooves for engaging with a detent pin, a shift lock release lever disposed at one side of the hinge pin for moving the shift lever forward and backward and having a locker for controlling the downward movement of the detent pin, and a key interlock switch disposed on the detent plate for sensing that the shift lever is in a "P" position through the detent pin when the shift lever shifts to a parking position.

Still another object of the present invention is to provide a shift lever device of the automatic transmission of a vehicle which is simple in structure, inexpensive to manufacture, durable in use, light in weight, and simple in its wiring.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to a shift lever device for the automatic transmission of a vehicle, which includes only one key interlock switch for additionally functioning as a parking position switch so as to simplify the structure of the vehicle and reduce the weight of the vehicle as well as the vehicle cost.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
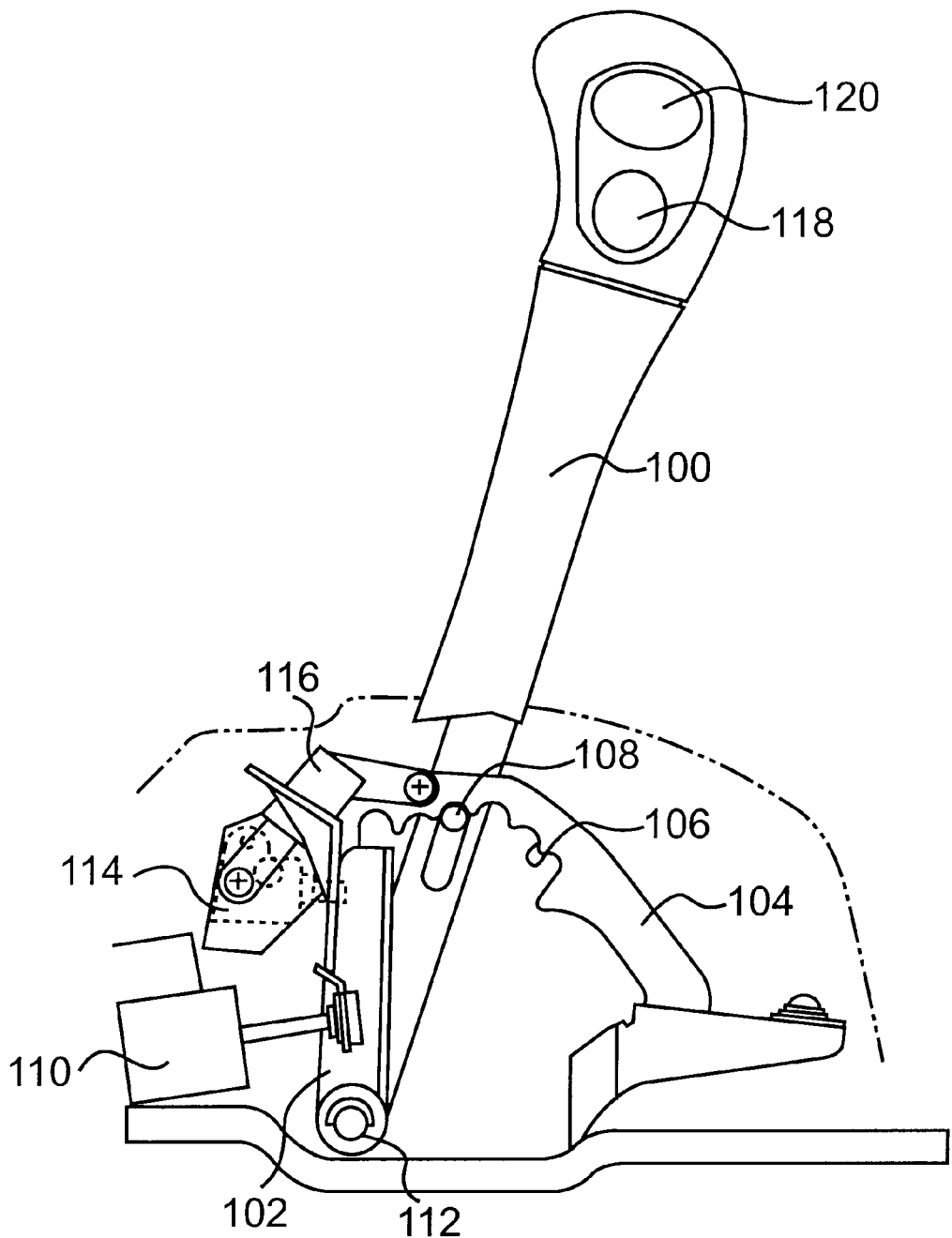
FIG. 1 is a perspective view of a conventional shift lever device for the automatic transmission of a vehicle.
Figure 2:
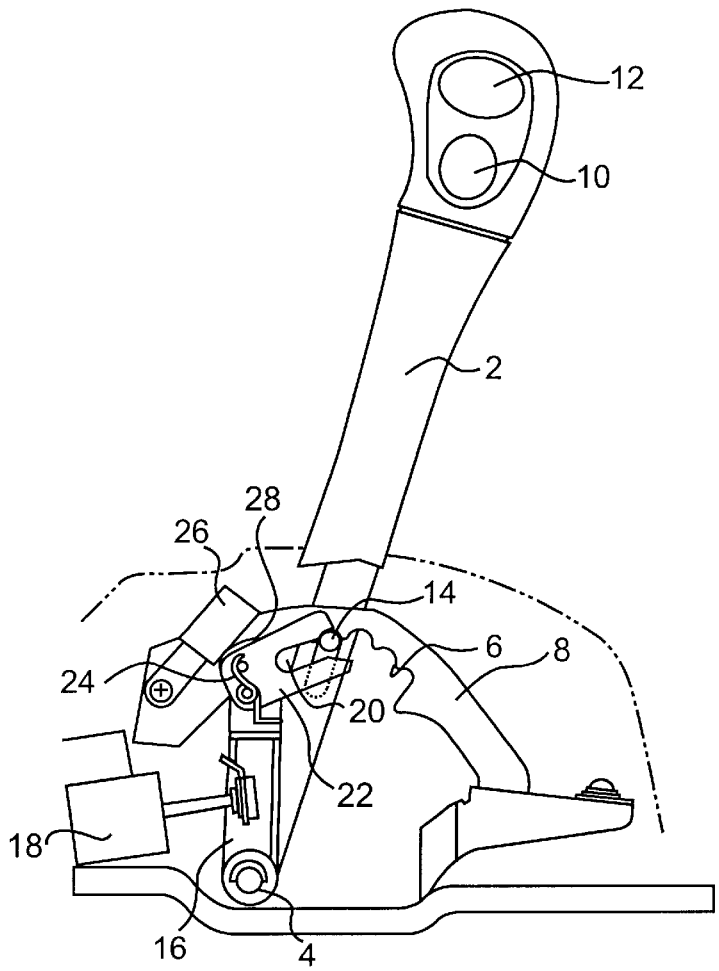
FIG. 2 is a perspective view of a shift lever device for the automatic transmission of a vehicle according to the present invention.
Figure 3:
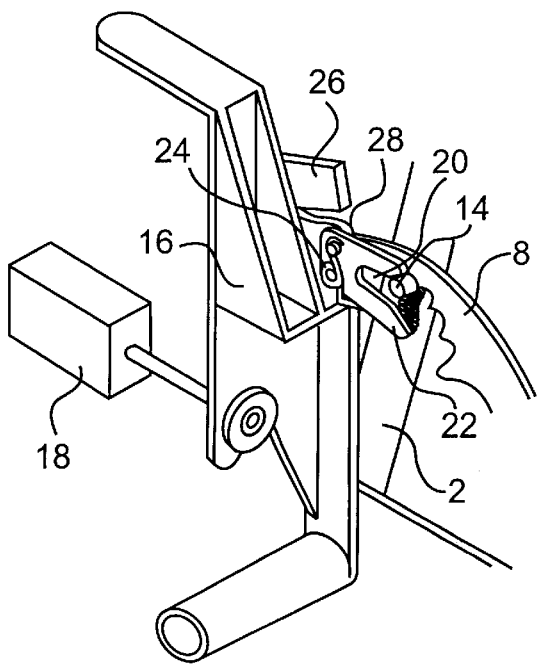
FIG. 3 is an enlarged perspective view of an essential portion of the shift lever device according to the present invention.

Referring now in detail to the drawings for the purpose of illustrating preferred embodiments of the present invention, the shift lever device for an automatic transmission of a vehicle a shown in FIGS. 2 and 3 includes a shift lever 2 which pivotally rotates at a certain angle around the hinge axle 4, and a detent plate 8 which is disposed at one side of the shift lever 2 and has a plurality of grooves for engagement with a detent pin 14. The detent pin 14 is operated by a push button 12 which is disposed on the knob 10 of the upper portion of the shift driver 2. Thus the detent pin 14 can prevent the shift lever from sliding along the full range of the detent plate when the shift lever 2 shifts from one position to another.

The shift lever device according to the present invention further includes a shift lock release lever 16 pivotally fixed at the end portion thereof to the hinge axle 4 for responding to the operation of the shift lock solenoid valve 18. A locker 22 disposed on the upper portion of the shift lock release lever 16 is adapted to move backwardly by the resilient force of a resilient member 24 e.g., a spring. As shown in FIGS. 2 and 3, the locker 22 is provided with a key interlock switch 26 which extends thereover, said interlock switch being disposed on the detent plate 8. The key interlock switch 26 actuates when the detent pill 14 moves up in the slot and a sensing lever 28 also moves up in the case where the shift lever 2 is in a parked position.

Figure 4:
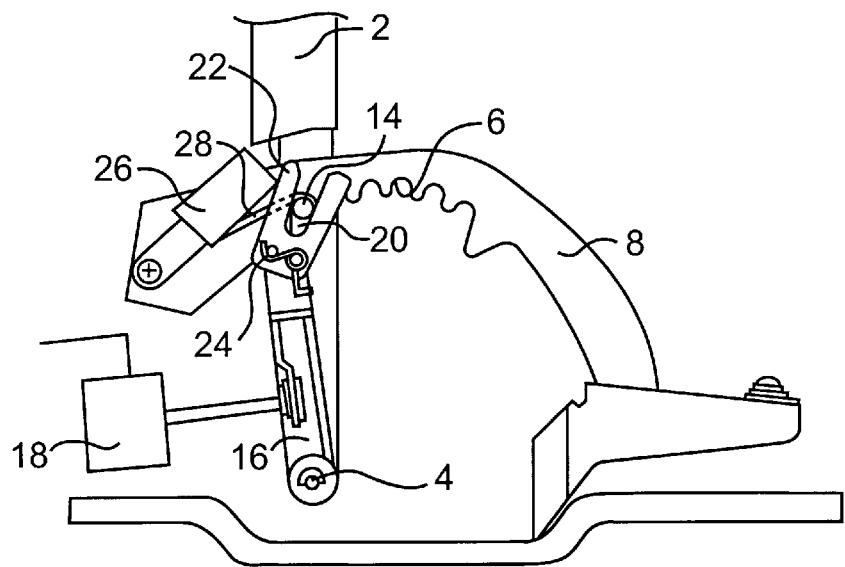
FIG. 4 is a perspective view of the shift lever disposed in a vehicle parking position according to the present invention.

The shift lock solenoid valve 18, pivotally fixed to the end portion of the shift lever 2, is operated by the operation of the brake pedal (not shown). The locker 22 contains a deep groove so as to lock the detent pin 14 therein when the locker rotates in a backward or reverse direction about the resilient member 24. Thus, when the locker 22 is in a vertical state as shown in FIG. 4, the shift lever 2 cannot shift if the brake deactivates.

The shift lever device for the automatic transmission of a vehicle, according to the present invention, operates as follows. As shown in FIG. 4, when the shift lever 2 is in the park "P" position, the locker 22 has rotated against the resilience of the resilient member 24, whereby the deep groove 20 of the locker 22 receives the detent pin 14 and the locker 22 is in a substantially vertical position. At this time, the deep groove 20 turns its opening toward the knob 10 of the shift lever 2. Therefore, even if the user depresses the push button 12, since the detent pin 14 which is engaged in the groove 6 of the detent plate 8 is also engaged with the deep groove 20 of the locker 22, the detent pin 14 is prevented from moving. Therefore, the shift lever 2 cannot shift.

Figure 5:
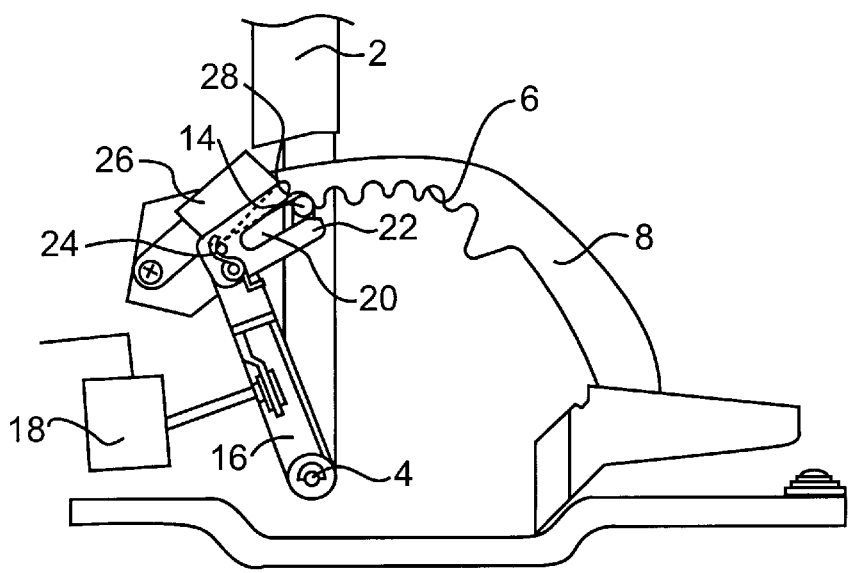
FIG. 5 is a perspective view of the shift lever removed from the parking position according to the present invention.

In turn, when the driver starts the engine and depresses the brake pedal (not shown), the lock solenoid valve 18 is actuated through a transmission controlling unit (not shown). Thus, the shift lock release lever 16 rotates in the backward direction about the hinge axle 4 as shown in FIG. 5. At this time, the locker 22 is moved in the backward direction by the resilient force of the resilient member 24, so that the deep groove 20 of the locker 22 is separated from the detent pin 14. Accordingly, the detent pin 14 can move to another groove 6 of the detent plate 8. That is, the shift lever 2 can freely shift.

At this time, if the driver shifts the shift lever 2 to another position such as a "D" or drive position, the shift lock solenoid valve 18 returns to its original position. Also, the key interlock switch 26 is deactivated. Therefore, this information signal is transmitted to the transmission controlling unit for locking the ignition key in position.

On the other hand, when the driver shifts the shift lever 2 to the "P" parking position in order to park the vehicle, the locker 22 rotates forwardly from a backward position and returns to its original position. Thereafter, if the driver releases the push button 12, the detent pin 14 moves up and the sensing lever 28 of the key interlock switch 26 moves up, too. Therefore, the ignition key can be released from interlock so that the ignition key can be separated from the key hole.

Accordingly, the shift lever device of the automatic transmission system for a vehicle is simple in structure, inexpensive to manufacture, durable in use, simple in wiring and has a light weight.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shift lever device for the automatic transmission of a vehicle which comprises:

a shift lever pivotally mounted at one end portion thereof and containing an operating means at the other end portion thereof;

a detent pin disposed intermediate said end portion for displacement in response to said operating means;

a detent plate operatively associated with said shift lever and containing a plurality of grooves for selectively receiving said detent pin by the operation of said operating means and the pivotal rotation of said shift lever;

a shift lock lever release lever pivotally mounted at one end, relative to said shift lever, said shift lock release lever containing a locking means pivotally mounted at the other end thereof for selectively securing said detent pin in said detent plate or releasing said detent pin for movement to the other grooves of said detent plate; and a key interlock switch operatively associated with said detent plate for interlocking an ignition key and sensing when the detent pin is in the parked position in the detent plate whereby the key interlock switch functions as an additional parking position switch, wherein said locking means includes a groove for receiving said detent pin, and secures said detent pin when positioned so that said groove is vertical.

2. The shift lever device of claim 1, wherein a shift lock solenoid valve means is connected to the shift lock release lever for rotating said shift lock release lever which, in turn, locks and unlocks the detent pin.

3. The shift lever device of claim 1, wherein said locking means is spring biased for engagement with the detent pin and said shift lock release lever is mounted for rotation against said bias.

4. The shift lever device of claim 1, wherein the locking means has a groove for operatively engaging said detent pin.

* * * * *